(12) United States Patent
Zimmerman et al.

(10) Patent No.: US 11,627,477 B2
(45) Date of Patent: Apr. 11, 2023

(54) BASE STATION ANTENNAS HAVING FIELD-ENABLED REMOTE ELECTRONIC TILT CAPABILITIES

(71) Applicant: CommScope Technologies LLC, Hickory, NC (US)

(72) Inventors: Martin L. Zimmerman, Chicago, IL (US); Shirley Forsythe, Sachse, TX (US); Dale R. Moore, Murphy, TX (US); Deepali Limaye, Frisco, TX (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 17/684,453

(22) Filed: Mar. 2, 2022

(65) Prior Publication Data

US 2022/0191710 A1 Jun. 16, 2022

Related U.S. Application Data

(63) Continuation of application No. 17/096,281, filed on Nov. 12, 2020, now Pat. No. 11,304,069.

(60) Provisional application No. 62/940,926, filed on Nov. 27, 2019.

(51) Int. Cl.
*H01Q 3/00* (2006.01)
*H04W 16/28* (2009.01)
*H04W 88/08* (2009.01)

(52) U.S. Cl.
CPC ............ *H04W 16/28* (2013.01); *H01Q 3/005* (2013.01); *H04W 88/085* (2013.01)

(58) Field of Classification Search
CPC .... H04W 16/28; H04W 88/085; H01Q 3/005; H01Q 3/30; H01Q 5/40; H01Q 1/36; H01Q 1/246; H01Q 1/50
See application file for complete search history.

(56) References Cited

U.S. PATENT DOCUMENTS

| 7,907,096 | B2 | 3/2011 | Timofeev et al. |
| 10,367,261 | B2 | 7/2019 | Webb et al. |
| 11,304,069 | B2* | 4/2022 | Zimmerman ............ H01Q 5/40 |
| 2011/0237315 | A1* | 9/2011 | Seeor ...................... H01Q 3/32 |
| | | | 455/575.7 |
| 2013/0127666 | A1 | 5/2013 | Zhang et al. |
| 2015/0091755 | A1 | 4/2015 | Chawgo |
| 2015/0168974 | A1 | 6/2015 | Mascarenhas et al. |
| 2016/0380821 | A1 | 12/2016 | Liu et al. |
| 2017/0084996 | A1* | 3/2017 | Shen ...................... H01Q 21/06 |
| 2017/0365921 | A1 | 12/2017 | Webb et al. |

(Continued)

*Primary Examiner* — Kenneth T Lam
(74) *Attorney, Agent, or Firm* — Myers Bigel, P.A.

(57) ABSTRACT

A method of configuring an antenna that includes a plurality of RET units that are associated with respective ones of a plurality of arrays of radiating elements is provided in which, for each array in a subset that includes at least one of the arrays, setting an output of the RET unit associated with the array to a position that corresponds to a pre-selected electronic downtilt for the array. A first RET unit configuration file is loaded into a memory of the antenna, where the first RET unit configuration file does not include configuration data for the RET units associated with the arrays that are included in the subset. A second RET unit configuration file is provided that includes configuration data for all of the RET units.

20 Claims, 4 Drawing Sheets

(56) References Cited

U.S. PATENT DOCUMENTS

2018/0227775 A1\* 8/2018 Bisiules .................. H01Q 5/48
2019/0334584 A1 10/2019 Cai et al.

\* cited by examiner

BASE STATION ANTENNAS HAVING FIELD-ENABLED REMOTE ELECTRONIC TILT CAPABILITIES

CROSS-REFERENCE TO RELATED APPLICATION

The present application is a continuation of, and claims priority under 35 U.S.C. § 120 to, U.S. patent application Ser. No. 17/096,281, filed, Nov. 12, 2020, which in turn claims priority under 35 U.S.C. § 119 to U.S. Provisional Patent Application Ser. No. 62/940,926, filed Nov. 27, 2019, the entire content of both of which are incorporated herein by reference.

FIELD OF THE INVENTION

The present invention relates to communication systems and, in particular, to base station antennas having remote electronic tilt capabilities.

BACKGROUND

Cellular communications systems are used to provide wireless communications to fixed and mobile subscribers. A cellular communications system may include a plurality of base stations that each provide wireless cellular service for a specified coverage area that is typically referred to as a "cell." Each base station may include one or more base station antennas that are used to transmit radio frequency ("RF") signals to, and receive RF signals from, the subscribers that are within the cell served by the base station. Each base station antenna includes one or more linear and/or planar arrays of radiating elements (e.g., patch or crossed dipole radiating elements) that are used to transmit and receive the RF signals. Each array concentrates the RF energy that is transmitted in or received from certain directions. The "gain" of an array in a given direction is a measure of the ability of the array to concentrate the RF energy in that direction. The "radiation pattern" of an array—which is also referred to as an "antenna beam"—is a compilation of the gain of the array across all different directions. Each antenna beam may be designed to service a pre-defined coverage area such as the cell or a portion thereof that is referred to as a "sector." Each antenna beam may be designed to have minimum gain levels throughout the pre-defined coverage area, and to have much lower gain levels outside of the coverage area to reduce interference between neighboring cells/sectors.

Early base station antennas generated antenna beams having fixed shapes, meaning that once a base station antenna was installed, its antenna beam(s) could not be changed unless a technician physically reconfigured the antenna. However, based on network coverage requirements, cellular operators may find it advantageous to adjust the elevation angle (i.e., the vertical angle with respect to the horizon at which the antenna beam has the highest gain) of an antenna beam that is generated by an array of radiating elements in order to change the coverage area of the array. The elevation angle is also referred to as the "tilt" angle of the antenna beam. Most modern base station antennas include so-called remote electronic tilt ("RET") capabilities that allow a wireless operator to electronically change the tilt angle of the antenna beam(s) generated by each array from a remote location. The tilt angle of an antenna beam may be electronically altered by transmitting control signals to the antenna that cause the antenna to alter the phases of the sub-components of the RF signals that are transmitted and received by the individual radiating elements of the array that generates the antenna beam.

In order to electronically change the tilt angle of an antenna beam generated by an array of radiating elements, a phase taper may be applied across the radiating elements of the array. Such a phase taper may be applied by adjusting the settings on a phase shifter that is positioned along the RF transmission path between a radio and the individual radiating elements of the array. One widely-used type of phase shifter is an electromechanical "wiper" phase shifter that includes a main printed circuit board and a "wiper" printed circuit board that may be rotated above the main printed circuit board. Such wiper phase shifters typically divide an input RF signal that is received at the main printed circuit board into a plurality of sub-components, and then couple at least some of these sub-components to the wiper printed circuit board. The sub-components of the RF signal may be coupled from the wiper printed circuit board back to the main printed circuit board along a plurality of arc-shaped traces, where each arc has a different diameter. Each end of each arc-shaped trace may be connected to a respective sub-group of radiating elements. By mechanically rotating the wiper printed circuit board above the main printed circuit board, the locations where the sub-components of the RF signal couple back to the main printed circuit board may be changed, which thus changes the lengths of the transmission paths from the phase shifter to the respective sub-groups of radiating elements. The changes in these path lengths result in changes in the phases of the respective sub-components of the RF signal, and since the arcs have different radii, the phase changes along the different paths will be different. Exemplary phase shifters of this variety are discussed in U.S. Pat. No. 7,907,096 to Timofeev, the disclosure of which is hereby incorporated herein in its entirety. Typically, the phase taper is applied by applying positive phase shifts of various magnitudes (e.g., $+X°$, $+2X°$ and $+3X°$) to some of the sub-components of the RF signal and by applying negative phase shifts of the same magnitudes (e.g., $-X°$, $-2X°$ and $-3X°$) to additional of the sub-components of the RF signal. Other electromechanical phase shifters, such as trombone or sliding dielectric phase shifters, may alternatively be used, as may a wide variety of electronic phase shifters.

Base station antennas that use electromechanical phase shifters typically include a plurality of so-called RET units that are used to move the moveable elements of the phase shifters associated with the respective arrays of radiating elements. Each RET unit may include an actuator and a moveable output member. In many cases, the actuator is implemented as a direct current ("DC") motor, and the moveable output member comprises a member that moves either linearly or rotationally in response to movement of the actuator. In some cases, a single actuator (called a multi-RET actuator) may be shared across a plurality of RET units in order to reduce the cost, weight and/or size of the antenna. A multi-RET actuator may include a drive motor that may be selectively connected to the output member of one of a plurality of RET units using, for example, a motorized selection system or a gear system.

In order to change the downtilt angle of an antenna beam generated by an array of radiating elements of a base station antenna, a control signal may be transmitted to the antenna that causes a RET unit associated with the array to generate a desired amount of movement in an output member thereof. The control signal may be transmitted over an Antenna Interface Standards Group (AISG) control channel to a RET controller included in the base station antenna. The RET controller includes software that decodes and processes AISG commands that are included in the AISG control signal and, in response thereto, transmits one or more control signals to the RET unit. The control signals transmitted to the RET unit may activate the actuator of the RET unit to move the output member thereof. A mechanical linkage that extends between the output member of the RET unit and the moveable element of a phase shifter associated with the array is used to translate the movement of the output member of the RET unit to movement of the moveable element of the phase shifter (e.g., a wiper arm). The mechanical linkage may comprise, for example, a series of longitudinally-extending fiberglass rods that are connected by linkages that extend in the width and/or depth directions of the antenna.

SUMMARY

Pursuant to embodiments of the present invention, methods of configuring an antenna are provided. The antenna includes a plurality of arrays of radiating elements and a plurality of RET units, where each RET unit is associated with a respective group of one or more of the arrays of radiating elements. Pursuant to certain methods of the present invention, for each array of radiating elements in a subset that includes at least one of the arrays of radiating elements, an output of the RET unit associated with the array of radiating elements is set to a position that corresponds to a pre-selected electronic downtilt for the array of radiating elements. A first RET unit configuration file is loaded into a memory of the antenna, where the first RET unit configuration file does not include configuration data for the RET units associated with the arrays of radiating elements that are included in the subset. A second RET unit configuration file is provided that includes configuration data for all of the RET units, including the RET unit(s) associated with the arrays of radiating elements that are part of the subset.

In some embodiments, setting the output of the RET unit associated with the array of radiating elements to the position that corresponds to the pre-selected electronic downtilt for the array of radiating elements may comprise physically setting the output of the RET unit associated with the array of radiating elements to the position that corresponds to the pre-selected electronic downtilt for the array of radiating elements.

In some embodiments, setting the output of the RET unit associated with the array of radiating elements to the position that corresponds to the pre-selected electronic downtilt for the array of radiating elements may comprise loading the second RET unit configuration file into the memory of the antenna, and then uploading a command to the antenna that causes the antenna to set the output of the RET unit associated with the array of radiating elements to the position that corresponds to a pre-selected electronic downtilt for the array of radiating elements. In some embodiments, the command may be uploaded prior to loading the first RET unit configuration file into the a memory of the antenna.

In some embodiments, the antenna may include a RET controller that is configured to receive an Antenna Interface Standards Group (AISG) control signal that includes the second RET unit configuration file as a payload appended thereto, and to load the second RET unit configuration file into the memory of the antenna. In some embodiments, the AISG control signal may comprise AISG 2.0 command number 0x32, AISG 2.0 command number 0x89 or AISG command numbers 0x40, 0x41 and 0x42.

In some embodiments, the antenna may be a base station antenna, and the at least one of the arrays of radiating elements in the subset is an array of radiating elements that is configured to operate in all or part of a 3.4-3.8 GHz frequency band.

Pursuant to further embodiments of the present invention, methods of configuring an antenna that includes a plurality of arrays of radiating elements and a plurality of RET units are provided, where each RET unit is associated with a respective group of one or more of the arrays of radiating elements. Pursuant to these methods, a first RET unit configuration file is loaded into a memory of the antenna, where the first RET unit configuration file includes configuration data for all of the RET units. For each array of radiating elements in a subset that includes at least one of the arrays of radiating elements, an output of the RET unit associated with the array of radiating elements is set to a position that corresponds to a pre-selected electronic downtilt for the array of radiating elements. For each array of radiating elements in the subset, the RET unit associated with the array of radiating elements is assigned to a bus that either does not exist or that is not accessible to an operator of the antenna.

In some embodiments, the antenna may further include a RET controller that is configured to reconfigure the assignments between the RET units and the buses in response to receipt of an Antenna Interface Standards Group (AISG) control signal.

In some embodiments, the AISG control signal may comprise AISG 2.0 command number 0x32, AISG 2.0 command number 0x89 or AISG command numbers 0x40, 0x41 and 0x42.

Pursuant to still further embodiments of the present invention, methods of configuring an antenna that includes a plurality of arrays of radiating elements and a plurality of RET units are provided, where each RET unit is associated with a respective group of one or more of the arrays of radiating elements. Pursuant to these methods, a first RET unit configuration file is loaded into a memory of the antenna, where the first RET unit configuration file includes, for each array of radiating elements in a first subset of the arrays of radiating elements, values that specify positions for an output of the RET unit associated with the array of radiating elements that correspond to different amounts of electronic downtilt, where each value is substantially the same so that the array of radiating elements will operate substantially as a fixed downtilt array of radiating elements.

In some embodiments, the methods may further comprise providing a second RET unit configuration file that includes, for each array of radiating elements, values that specify positions for an output of the RET unit associated with the array of radiating elements that correspond to different amount of electronic downtilt, where each value for a position of the output of the RET unit is a value that will implement the corresponding amount of electronic downtilt to an antenna beam generated by the associated array of radiating elements.]

In some embodiments, the antenna may include a RET controller that is configured to receive an Antenna Interface Standards Group (AISG) control signal and to load a RET unit configuration file into the memory of the antenna that is included in the AISG control signal.

In some embodiments, the AISG control signal may comprise AISG 2.0 command number 0x32, AISG 2.0 command number 0x89 or AISG command numbers 0x40, 0x41 and 0x42.

In some embodiments, the antenna may comprise a base station antenna, and wherein the at least one of the arrays of radiating elements in the subset is an array of radiating elements that is configured to operate in all or part of a 3.4-3.8 GHz frequency band.

Pursuant to additional embodiments of the present invention, methods of configuring the remote electronic tilt ("RET") units on a base station antenna are provided in which an antenna that includes a plurality of arrays of radiating elements that each include an associated RET unit is installed, where each of the arrays of radiating elements in a subset of at least one of the arrays of radiating elements is initially to be operated as a fixed downtilt array of radiating elements, and where for each array of radiating elements in the subset of at least one of the arrays of radiating elements, an output member of the RET unit associated with the array of radiating elements is set to a pre-selected position corresponding to a pre-selected electronic downtilt for the array of radiating elements, and wherein a first RET unit configuration file that does not recognize the arrays of radiating elements included in the subset of at least one of the arrays of radiating elements is stored in a memory of the base station antenna. Thereafter, a second RET unit configuration file is loaded that recognizes the arrays of radiating elements included in the subset of at least one of the arrays of radiating elements.

DETAILED DESCRIPTION

Figure 1:
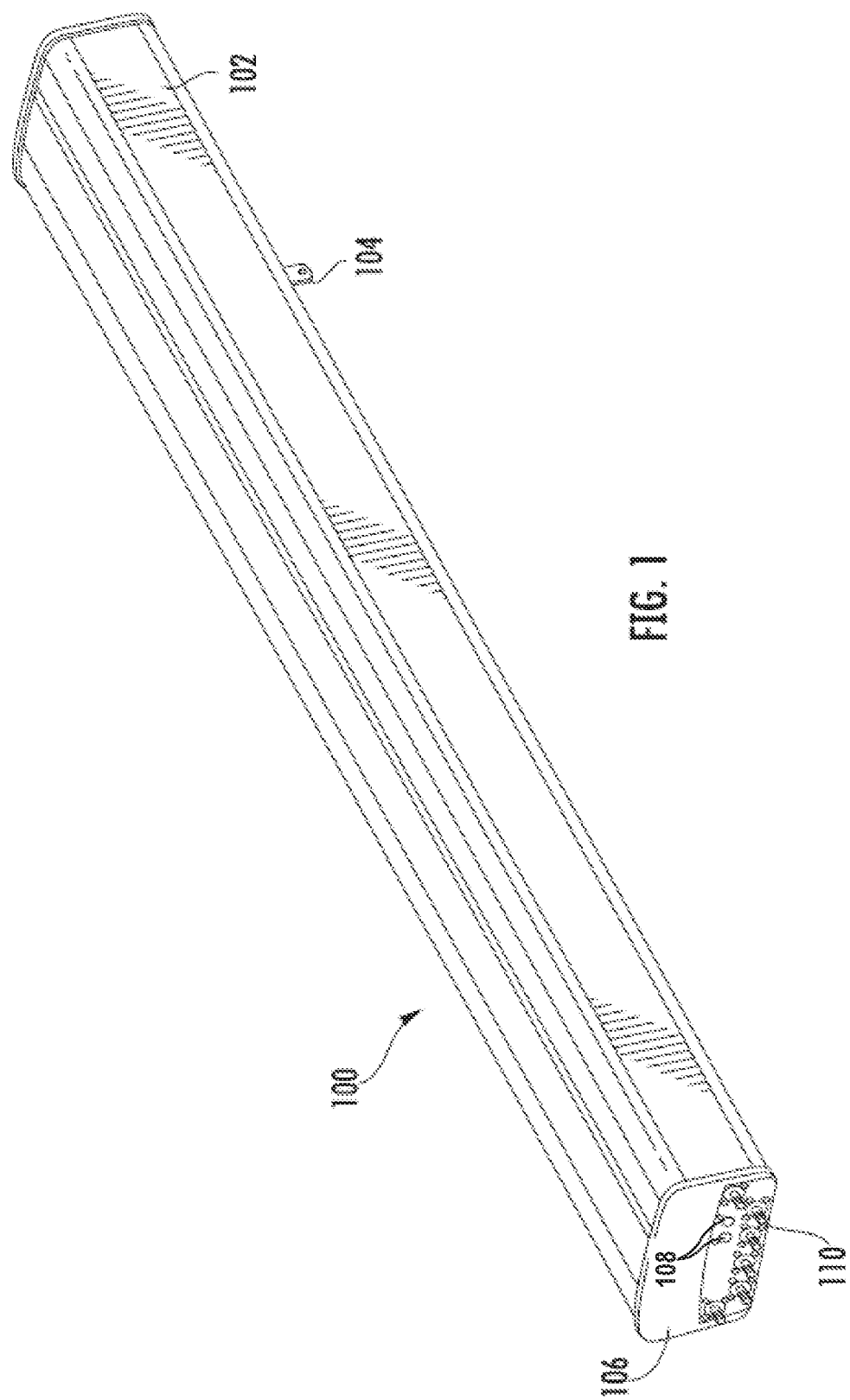
FIG. 1 is a perspective view of a base station antenna according to embodiments of the present invention.

There are some situations in which a wireless operator may initially configure an array of a base station antenna to operate at a fixed downtilt that cannot be adjusted in the field, but may also want to have the option of converting this fixed downtilt array into an array that has remote electronic downtilt capabilities in the future. For example, some wireless operators are currently deploying base station antennas having arrays of radiating elements that operate in the Citizens Band Radio Service ("CBRS") frequency band, which extends from about 3.4-3.8 GHz. In some situations, it may be necessary for a wireless operator to have the radiation patterns for arrays operating in the CBRS frequency band pre-approved to ensure that the radiation patterns do not cause undue interference with government entities that also operate wireless networks in the same frequency band. Since the radiation pattern for an array of a base station antenna changes if the array is electronically downtilted, some wireless operators may prefer to operate some or all of the CBRS arrays to have antenna beams that have pre-selected fixed (i.e., non-adjustable) electronic downtilt angles to ensure that interference with the government entities is avoided. However, at some later time, it may be desirable to convert these arrays to have remote electronic downtilt capabilities, since the government requirements may be relaxed or eliminated in the future, or where approval could be obtained for a radiation pattern having a different amount of downtilt.

Pursuant to embodiments of the present invention, techniques are provided that will allow a wireless operator to deploy base station antennas where some (or all) of the arrays of radiating elements thereof are initially configured to have a fixed downtilt angle that cannot be adjusted. These antennas, however, are configured so that they can later be enabled in the field (e.g., by a wireless operator) to have full remote electronic downtilt capabilities in response to a command or by uploading a new RET unit configuration file to the antenna. The base station antennas according to embodiments of the present invention may have one or more arrays of radiating elements that include associated RET units, adjustable phase shifters and mechanical linkages that are present in the antenna at the time of manufacture, but effectively "turned off" so that the one or more arrays of radiating elements will initially have a fixed electronic downtilt that cannot be adjusted. This equipment, however, may later be reconfigured, if desired, so that the fixed downtilt arrays may be converted to have full remote electronic downtilt capabilities.

In a first embodiment of the present invention, base station antennas may be configured so that each RET unit that is associated with a fixed downtilt array does not appear to be present in the antenna (i.e., the RET unit is made "invisible"). This can be achieved, for example, by setting the RET unit associated with each fixed downtilt array to apply a pre-selected fixed downtilt to the array, and loading a first RET unit configuration file into the RET controller of the antenna that does not include entries for the RET units associated with the fixed downtilt arrays. The subset of the RET units that are not included in the RET unit configuration file are thus made invisible to the RET controller on the base station antenna, and hence the downtilt angle for the antenna beams generated by these arrays cannot be adjusted. The wireless operator may also be provided with a second RET unit configuration file for the antenna that includes entries for all of the RET units, specifically including the RET units whose corresponding arrays were initially operated as fixed downtilt arrays. If the wireless operator later finds that it is possible to vary the tilt angle on these arrays, the second RET unit configuration file may be uploaded to the antenna (where it may replace the first RET unit configuration file), which will then allow the wireless operator to electronically adjust the tilt angle on all of the arrays, including on the fixed downtilt arrays.

In a second embodiment of the present invention, the base station antenna may be configured so that the RET units associated with each array that is to be operated as fixed downtilt array is assigned to a non-existent bus or to a bus that is not accessible to the wireless operator. As such, the RET controller will not process any commands that are sent by the wireless operator instructing the antenna to change the amount of electronic downtilt for these fixed downtilt arrays. If later a decision is made to operate one or more of the fixed downtilt arrays as variable downtilt arrays, new assignments between the RET units and the buses may be uploaded to the antenna so that the RET units are assigned to a bus that is controlled by the wireless operator.

In a third embodiment of the present invention, the base station antenna may be configured so that each array that initially will not have remote electronic downtilt capabilities is configured to have a very tight range of downtilt angles. This may be accomplished by including incorrect or "false" data in the RET unit configuration file for the RET units associated with any fixed downtilt arrays. In particular, a data structure that is referred to herein as a "downtilt table" (which is part of the RET unit configuration file) is typically loaded into memory in the antenna that specifies the positions of the output members of the RET units that correspond to different amounts of electronic downtilt. The actual data in the downtilt table for the RET units associated with fixed downtilt arrays may be replaced with "false" data that constrains the output member of these RET units to stay within a very tight range that corresponds to a very tight range of tilt angles, which effectively constrains these arrays to operate at fixed downtilts, even in situations where the antenna is instructed to change the downtilt angle for the "fixed tilt" arrays. For example, if a fixed downtilt of 6.0° is desired for a particular array, a downtilt table may be loaded into the antenna for the RET unit associated with the array at issue that specifies that the output member of the RET unit be maintained at a substantially constant position, regardless of the specified electronic downtilt angle. Such a technique may be used keep the tilt angle for the antenna beams associated with the array in a very tight range such as 5.8°-6.2°, 5.9-6.1° or even at a constant tilt angle of 6.0° (which may be achieved by specifying the same position for the output member of the RET unit for every possible requested value for the tilt angle). In this embodiment, the array will seemingly function as a remote electronic downtilt array, but the change that is effected to the downtilt angle is made to be de minimis using the false data. If the fixed tilt array later needs to be upgraded to have remote electronic downtilt capabilities, a new RET unit configuration file having an updated downtilt table may be loaded into the antenna, where the new downtilt table specifies the actual (i.e., correct) positions of the output member of the RET unit associated with the array that will impart the desired amounts of remote electronic downtilt.

Embodiments of the present invention will now be discussed in greater detail with reference to the drawings. In some cases, two-part reference numerals are used in the drawings. Herein, elements having such two-part reference numerals may be referred to individually by their full reference numeral and may be referred to collectively by the first part of their reference numerals.

Figure 2:
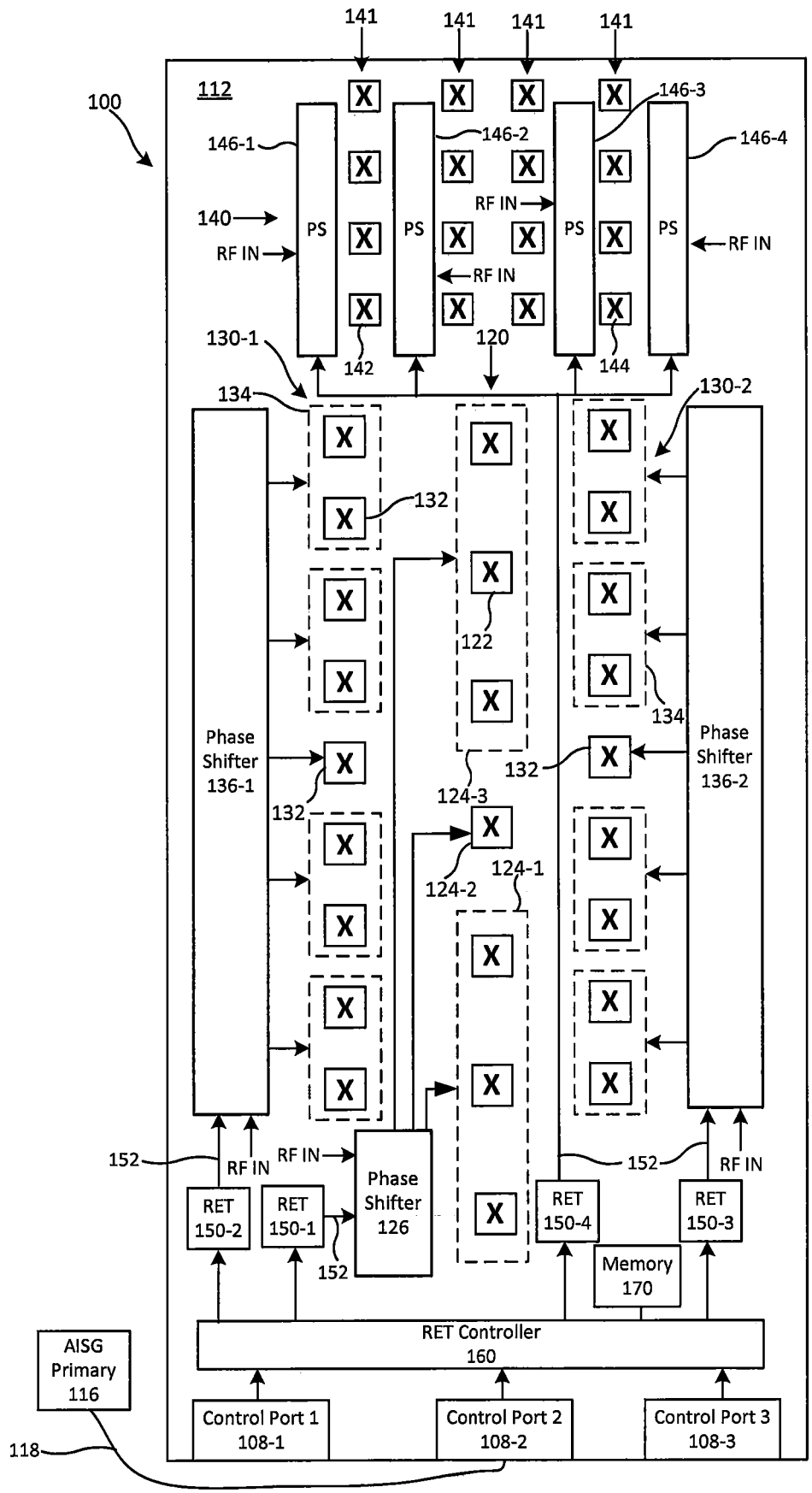
FIG. 2 is a schematic block diagram illustrating various of the components of the base station antenna of FIG. 1 and the electrical and mechanical connections therebetween.

FIG. 1 is a perspective view of a base station antenna 100 according to embodiments of the present invention. FIG. 2 is a schematic block diagram of the base station antenna of FIG. 1 that illustrates the arrays of radiating elements included in the antenna as well as the feed networks and RET control system for the base station antenna 100. It should be noted that FIG. 2 does not necessarily show the actual physical locations of the various elements, but instead is drawn to merely show the electrical and mechanical connections between the various elements.

As shown in FIG. 1, the RET antenna 100 includes a radome 102, a mounting bracket 104, and a bottom end cap 106. A plurality of control ports 108 are mounted in bottom end cap 106. The control ports 108 may carry control signals to the base station antenna 100 from a controller that is located remotely from base station antenna 100. These control signals may include control signals for electronically changing the tilt angle of the antenna beams generated by the base station antenna 100. A plurality of RF connector ports 110 are also mounted in the end cap 106. Coaxial cables (not shown) may be connected between the RF connector ports 110 and the RF ports on one or more radios (not shown). These coaxial cables may carry RF signals between the radios and the base station antenna 100. Note that only a subset of the RF ports 110 are shown in FIG. 1 to simplify the drawing.

Referring to FIG. 2, the base station antenna 100 includes a linear array 120 of low-band radiating elements 122 (i.e., radiating elements that transmit and receive signals in a lower frequency band such as, for example, all or part of the 617-960 MHz frequency band), two linear arrays 130-1, 130-2 of mid-band radiating elements 132 (i.e., radiating elements that transmit and receive signals in a mid-range frequency band such as, for example, all of part of the 1695-2690 MHz frequency band), and a planar (four column) array 140 of high-band radiating elements 142 (i.e., radiating elements that transmit and receive signals in a high frequency band such as, for example, all of part of the 3.4-3.8 GHz frequency band). As is further shown in FIG. 2, the base station antenna 100 also includes phase shifters 126, 136-1, 136-2 and 146-1 through 146-4, RET units 150-1 through 150-4, and a RET control 160.

The radiating elements 122, 132, 142 may be mounted to extend forwardly from a backplane 112 which may be implemented, for example, as a sheet of metal. Each of the radiating elements 122, 132, 142 is schematically illustrated as being implemented as a cross-polarized radiating element that includes a first dipole that is oriented at an angle of −45° with respect to the azimuth plane and a second dipole that is oriented at an angle of +45° with respect to the azimuth plane when the base station antenna 100 is mounted for normal use. Since cross-polarized radiating elements are provided, each array 120, 130-1, 130-2, 140 will generate two antenna beams, namely a first antenna beam generated by the −45° dipoles and a second antenna beam generated by the +45° dipoles. In order to simplify the figure, the phase shifters for only the first of the two polarizations are shown in FIG. 2. It will be appreciated that the phase shifters for the second polarization may be configured in the exact same manner. Typically, a single RET unit 150 is used to move the moveable elements on the electromechanical phase shifters for both the first and second polarization radiators of an array of radiating elements, since the same amount of down-tilt would typically be applied for each polarization, and hence additional RET units 150 may not be required for the second polarization.

As shown in FIG. 2, low-band linear array 120 includes a total of seven radiating elements 122 that are grouped into three sub-arrays 124-1 through 124-3. The upper and lower sub-arrays 124-1, 124-3 each include three radiating elements 122, while the middle sub-array 124-2 includes a single radiating element 122. Mid-band linear arrays 130-1 and 130-2 may be identical to each other, with each array 130 including a total of nine radiating elements 132. Eight of the radiating elements 132 in each linear array 130-1, 130-3 are grouped into sub-arrays 134 that include two radiating elements 132 each, while the ninth radiating element 132 forms its own sub-array 134. Each radiating element 122, 132 in a given sub-array 124, 134 may transmit and receive the same signals. Grouping multiple radiating elements 122, 132 (typically two or three) into sub-arrays 124, 134 may reduce the number of ports on the phase shifters that are required for proper operation of the base station antenna 100. High-band array 140 includes four columns 141 of radiating elements 142. Each radiating element 142 may form its own sub-array 144. Each column 141 receives a separate RF signal.

While FIG. 2 shows antenna 100 as having a single linear array 120 that includes seven low-band radiating elements 122, two linear arrays 130 that each include nine mid-band radiating elements 132, and a four-column planar high-band array 140 with each column 141 including four high-band radiating elements 142, it will be appreciated that the number of arrays 120, 130, 140 and the number of radiating elements 122, 132, 142 included in each of the arrays 120, 130, 140 may be varied. It will also be appreciated that the number(s) of radiating elements 122, 132, 142 per sub-array 124, 134, 144 may be varied, that different types of radiating elements, 122, 132, 142 may be used (including single polarization radiating elements) and that numerous other changes may be made to the base station antenna 100 without departing from the scope of the present invention.

Each RF connector port 110 (FIG. 1) is coupled to an input port on a respective one of the phase shifters 126, 136-1, 136-2 and 146-1 through 146-4. The input ports to the phase shifters are labelled "RF IN" in FIG. 2, and will operate as input ports for RF signals being transmitted by base station antenna 100, and as output ports for RF signals that are received by base station antenna 100. Each phase shifter 126, 136-1, 136-2 and 146-1 through 146-4 includes a plurality of outputs, where each output is coupled to a respective sub-array of one of the arrays 120, 130, 140 of radiating element. Each phase shifter 126, 136-1, 136-2 and 146-1 through 146-4 may split an RF signal that is input thereto into a plurality of sub-components, apply a desired amount of phase shift to the respective sub-components of the RF signal in order to achieve a desired tilt (elevation) angle for the antenna beams generated by the associated arrays 120, 130, 140, and outputs the phase-shifted sub-components of the RF signal to the respective sub-arrays 124, 134, 144 of radiating elements 122, 132, 142.

The base station antenna 100 further includes a plurality of RET units 150-1 through 150-4 that are controlled by a RET controller 160. The base station antenna 100 also includes three control ports 108-1, 108-2, 108-3. Each control port 108 may comprise, for example, an RS-485 connector or an RF connector in conjunction with a smart bias tee that separates low frequency control signals from the RF data signals. In the depicted embodiment, the control ports comprise RS-485 connectors.

Each RET unit 150 is connected to a respective one of the phase shifters 126, 136-1, 136-2 and 146-1 through 146-4 via a respective mechanical linkage 152. As discussed above, each RET unit 430 may comprise, for example, an actuator such as a DC motor and an output member. Movement of the output member in response to movement of the actuator is carried by the mechanical linkage 152 to a moveable element of the associated electromechanical phase shifters 126, 136-1, 136-2 and 146-1 through 146-4. Thus, each RET unit 150 may provide the mechanical action that adjusts an associated one of the phase shifters 126, 136-1, 136-2 and 146-1 through 146-4 in order to apply a phase taper to the radiating elements of an array in order to change the tilt angle of the antenna beam formed thereby.

As is further shown in FIG. 2, each RET unit 150 is coupled to the RET controller 160. The RET controller 160 may comprise, for example, an integrated circuit chip that is mounted on a printed circuit board such as, for example, an application specific integrated circuit (ASIC) chip or a microprocessor. In some embodiments, each RET unit 150 may be connected to a pair of output ports of the RET controller 160 via a pair of wires such as, for example, a cable that includes two insulated conductors. Control signals may be transmitted from the RET controller chip 160 to each RET unit 150 over these respective wire pairs in order to control operation of the RET units 150. The communications between the RET controller 160 and the RET units 150 may comprise serial communications in some embodiments, and may be transmitted using any appropriate protocol/interface such as, for example, RS-485, SPI, $I^2C$ or by voltages that are input directly to the RET units 150.

Each control port 108 is coupled to the RET controller 160. The RET controller 160 may, for example, pass control signals between the control ports 108 and the RET units 150. The RET controller 160 may route the control signals according to data in a RET unit configuration file that is stored in a memory 170 of the base station antenna 100. As will be discussed in detail herein, the data in the RET unit configuration file may be initially set so that some of arrays will operate as fixed downtilt arrays. Later, the data in the RET unit configuration file may be changed or the RET unit configuration file may be replaced in order to reconfigure these fixed downtilt arrays to operate as variable downtilt arrays. In some embodiments, the changes to the data in the configuration file may be provided to the RET controller using an AISG command.

Each phase shifter 126, 136-1, 136-2 and 146-1 through 146-4 shown in FIG. 2 may be implemented, for example, as a rotating wiper phase shifter. The phase shifts imparted by a particular one of the phase shifters to each sub-component of an RF signal may be controlled by a mechanical positioning system that physically changes the position of the rotating wiper of each phase shifter. It will be appreciated that other types of phase shifters may be used instead of rotating wiper phase shifters such as, for example, trombone phase shifters, sliding dielectric phase shifters and the like.

Figure 3:
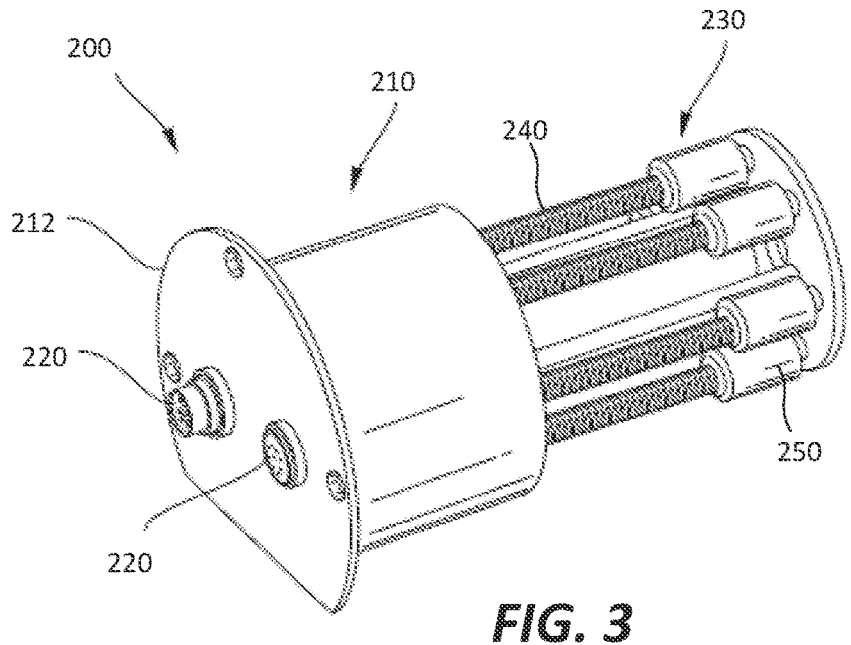
FIG. 3 is perspective view of a multi-RET actuator that may be included in the base station antenna of FIGS. 1-2.

As noted above, a RET unit is used to drive the moveable element of each phase shifter 126, 136-1, 136-2 and 146-1 through 146-4. FIG. 3 is a perspective view of a multi-RET actuator 200 that may be used to implement the four RET units 150-1 through 150-4 that are included in base station antenna 100. As shown in FIG. 3, the multi-RET actuator 200 includes a housing 210 and a pair of connectors 220 that are mounted so as to extend through the housing 210. The connectors 220 may connect to communications cables that may be used to deliver control signals from the RET controller 160 to the multi-RET actuator 200.

The multi-RET actuator 200 further includes four generally parallel worm gear shafts 240 that extend along respective parallel axes. The worm gear shafts 240 are rotatably mounted in the housing 210. A drive motor (not shown) may be mounted in the housing 210 that may be used to rotate a selected one of the worm gear shafts 240. Various selection mechanisms may also be mounted within the housing 210 that may be used to select one of the worm gear shafts 240 so that the drive motor is operatively connected to the selected worm gear shaft 240.

An internally threaded piston 250 is mounted on each worm gear shaft 240 and is configured (e.g., via threads) to move axially relative to the worm gear shaft 240 upon rotation of the worm gear shaft 240. Each piston 250 may be connected to a mechanical linkage 152 (FIG. 2) that connects the piston 250 to a moveable element on one or more phase shifters of the antenna, such that axial movement of the piston 250 can be used to apply a phase taper to the sub-components of RF signals that are transmitted and received through an array of the antenna. Each piston 250 may be moved in either direction along its associated worm gear shaft 240 by changing the direction of rotation of the worm gear shaft 240.

As discussed above, it may be desirable to configure some or all of the arrays 120, 130, 140 of radiating elements 122, 132, 142 of base station antenna 100 to initially have a fixed downtilt angle, but to allow for the antenna 100 to be reconfigured later so that these "fixed downtilt" arrays may have remote electronic downtilt capabilities. Pursuant to embodiments of the present invention, several different methods of providing such a capability are disclosed.

Pursuant to a first of these methods, a subset of the arrays 120, 130, 140 (e.g., array 140) on base station antenna 100 may be configured as fixed downtilt arrays by making the RET units 150 that control the subset of the arrays invisible to the wireless operator. In this particular example, it will be assumed that the CBRS array 140 of radiating elements 142 is the only array in base station antenna 100 that is to be operated as a fixed tilt array, but it will be appreciated that additional or different of the arrays 120, 130, 140 could be included in the subset, or that even all of the arrays 120, 130, 140 could be in the subset of arrays that are to be operated as fixed downtilt arrays. At least in some cases, the RET unit 150 for at least one of the arrays must be visible and addressable by equipment of the wireless operator since, if all of the RET units 150 are invisible, then there will not be any RET units 150 to which the wireless operator can send a re-configuration command.

In one example embodiment, the array 140 may be configured to operate as a fixed downtilt array and to be invisible to the wireless operator by first setting an output member of the RET unit 150-4 that is associated with array 140 to a position that corresponds to a pre-selected electronic downtilt for the array 140. This will ensure that array 140 has the desired amount of fixed tilt. In some embodiments, this may be accomplished by physically setting the output member of RET unit 150-4 to a position that will apply the pre-selected electronic downtilt to the array 140, which can be done manually or by activating the actuator for the RET unit 150-4. In other embodiments, this may be accomplished by loading a second RET unit configuration file into the memory 170 of base station antenna 100 that includes or "recognizes" all of the RET units 150 included in base station antenna 100, specifically including the RET unit 150-4. Then, a RET command may be uploaded to the base station antenna 100 and, in response to that command, the RET controller 160 may set the output of the RET unit 150-4 to the position that will provide the preselected amount of fixed electronic downtilt for array 140.

The first and second RET unit configuration files may include data that is necessary for proper operation of the RET units 150 associated with the arrays 120, 130, 140. For example, each RET unit configuration file may set the range over which the tilt angle for each array may be adjusted (e.g., from 0° to 10°), and may specify the position of the output member of each RET unit 150 that corresponds to each amount of downtilt (e.g., the positions of the output member may be specified for each tilt angle from 0° to 10° in increments of 0.1°). It will also be appreciated that equivalent information may alternatively be included in the RET unit configuration file (e.g., rotations of a RET actuator that are required to switch from each possible tilt angle to each other possible tilt angle instead of specifying the positions of the output members of the RET units 150).

In order to ensure that a technician or other operator cannot thereafter change the electronic downtilt setting for array 140, a first RET unit configuration file may then be loaded into the memory 170 of base station antenna 100. This first RET unit configuration file does not include configuration data for the RET unit 150-4 that is associated with the fixed downtilt array 140. As such, the RET controller 160 will be unable to adjust the electronic downtilt on the RET unit 150-4 associated with array 140.

Thereafter, the wireless operator may decide to convert array 140 from a fixed downtilt array to a variable downtilt array. To accomplish this, the wireless operator may be provided a copy of the second RET unit configuration file that includes data, for example, for all of the RET units, including RET unit 150-4. This second RET unit configuration file may be uploaded into the memory 170 of base station antenna 100 where it may replace or override the first RET unit configuration file. This will allow the wireless operator to electronically adjust the downtilt angle for all of the arrays 120, 130, 140 included in base station antenna 100.

The second RET unit configuration file may be uploaded to base station antenna 100 in any appropriate way. In some embodiments, the techniques disclosed in U.S. Pat. No. 10,367,261 (herein the '261 patent") may be used to upload the second configuration file to base station antenna 100. The entire contents of the '261 patent are incorporated herein by reference.

Figure 4:
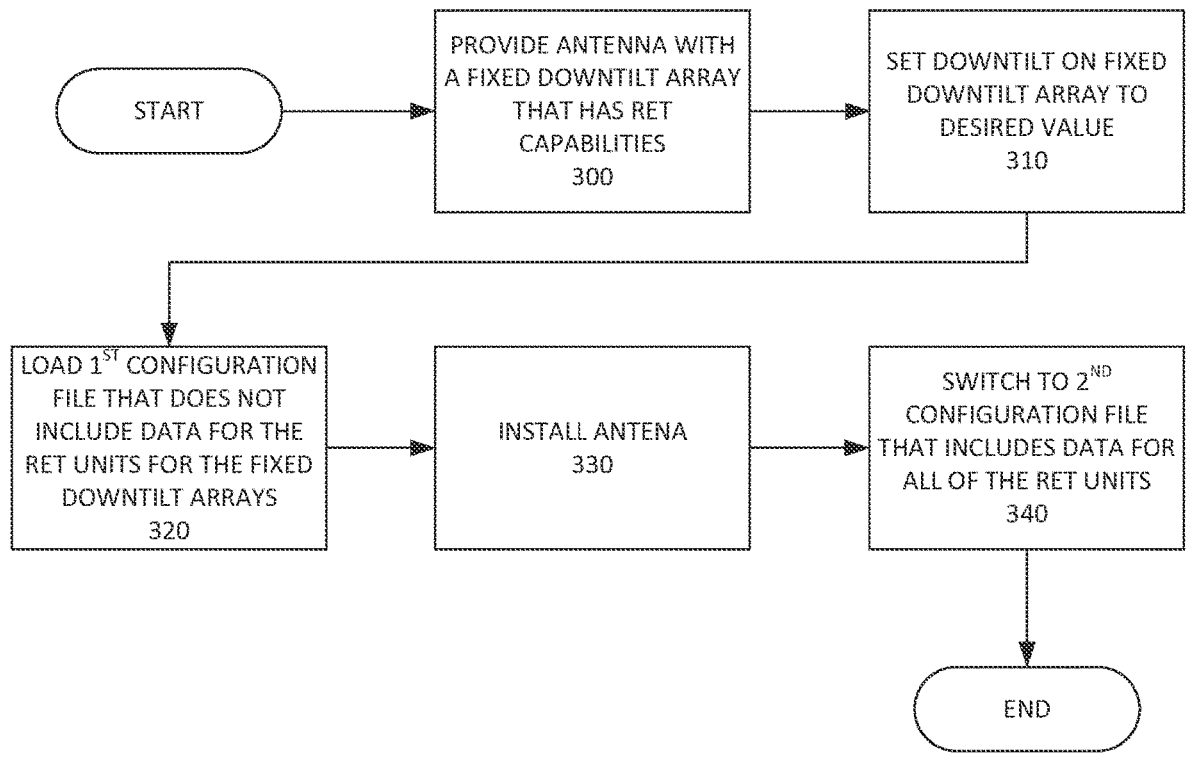
FIG. 4 is a flow chart illustrating a first method according to embodiments of the present invention of initially configuring an array of radiating elements that is included in a base station antenna to operate as fixed downtilt array.

FIG. 4 is a flow chart illustrating one particular embodiment of the above-described first method for configuring an array on a base station antenna to initially have a fixed downtilt, but to be configurable to later have remote electronic downtilt capabilities. As shown in FIG. 4, pursuant to this first method, a base station antenna is provided that includes at least one array of radiating elements that is to configured to have a fixed downtilt (Block 300). The RET units that correspond to the one or more fixed downtilt arrays are set to have the desired amount fixed downtilt (Block 310). This may be accomplished, for example, either by physically setting the output members of the RET units to the appropriate position, or by loading a second RET unit configuration file into the antenna that recognizes all of the RET actuators that are included in the antenna and then uploading commands to the antenna that set the phase shifters for the fixed downtilt arrays to the proper settings to achieve the desired fixed amounts of downtilt.

A first RET unit configuration file is loaded into the antenna that does not recognize (i.e., include information regarding) the RET units that are associated with the fixed downtilt arrays (Block 320). The antenna may then be shipped to a wireless operator (i.e., a customer) and installed for use (Block 330). Thereafter, the wireless operator may decide to transition one or more of the fixed downtilt arrays to have remote electronic downtilt capabilities. When such a decision is made, the wireless operator may upload a second RET unit configuration file that recognizes all of the RET actuators (Block 340). This will allow the wireless operator to perform remote electronic downtilt on all of the arrays in the antenna.

It will be appreciated that many modifications may be made to the above described methods without departing from the scope of the present invention. For example, instead of providing the second RET unit configuration file directly to the wireless operator, the second RET unit configuration file may be pre-loaded into the memory of the antenna, and the antenna may be configured to switch from the first RET unit configuration file to the second RET unit configuration file in response to a command. This technique provides an alternative method of providing the second RET unit configuration file (namely by preloading the file and then accessing it through use of a command). It will also be appreciated that the first and second RET unit configuration files may be implemented as separate files or may be a combined file that includes two portions.

Pursuant to a second method, a subset of the arrays 120, 130, 140 (e.g., array 140) on base station antenna 100 may be configured as fixed downtilt arrays by assigning the RET units associated with the arrays that are to be operated as fixed downtilt arrays to a non-existent bus or to a bus that is not accessible to the wireless operator.

By way of background, and referring to FIG. 2, a cellular base station may include one or more so-called AISG Primaries 116, which are devices that generate control signals that, among other things, may be used to control the RET units 150 in base station antenna 100. The commands issued by an AISG Primary 116 may comply with an industry standardized control scheme known as the AISG 2.0 protocol that specifies formats and other parameters of the AISG commands. Each AISG Primary 116 may comprise a standalone unit, may be integrated into a baseband unit 112 at the base station, or may be integrated into a radio such as a tower-mounted remote radio head. In the example of FIG. 2, a single AISG Primary 116 is used that is connected to control port 108-2 on base station antenna 100 via a bus 118 that is referred to as an AISG/3GPP bus. The AISG/3GPP bus 118 may be implemented, for example, as a control signal cable.

If base station antenna 100 is controlled and used by a single wireless operator, then a single AISG Primary 116 will typically be coupled to the antenna 100, as is shown in FIG. 2. AISG commands, such as commands for controlling the RET units 150 may be received by the RET controller 160 from the AISG Primary 116 over the AISG/3GPP bus 118. The RET controller 160 may include software that processes AISG commands and, in response thereto, transmits control signals to the individual RET units 150 to control the operations thereof. For example, the RET controller 160 may receive an AISG command and in response thereto may control one of the RET units 150 to activate the actuator thereof to change the amount of electronic downtilt applied to one of the arrays 120, 130, 140 of base station antenna 100.

The RET controller 160 may include software that routes control signals received at specific ones of the control ports 108 to specific ones of the RET units 150. For example, if a single AISG Primary 116 is connected to control port 108-2, and all of the arrays 120, 130, 140 are to be operated as variable tilt arrays, then the RET controller 160 may be configured to route control signals received at the second control port 108-2 to all four of the RET units 150-1 through 150-4. Control signals (if any) received at the other two control ports 108-1, 108-3 would not be processed. By assigning the RET unit 150 for array 140 to either control port 108-1 or control port 108-3, or to a control port that does not exist (e.g., an imaginary control port 108-4), any control signals relating to RET unit 150-4 that are received at control port 108-2 will be ignored by the RET controller 160, effectively turning array 140 into a fixed downtilt array. Note that, as with the first method discussed above, with the second method the RET unit 150 for at least one of the arrays must be visible and addressable by equipment of the wireless operator. If this is not the case (and hence all of the RET units 150 are invisible), there may not be any RET units 150 to which the wireless operator can send a re-configuration command.

Figure 5:
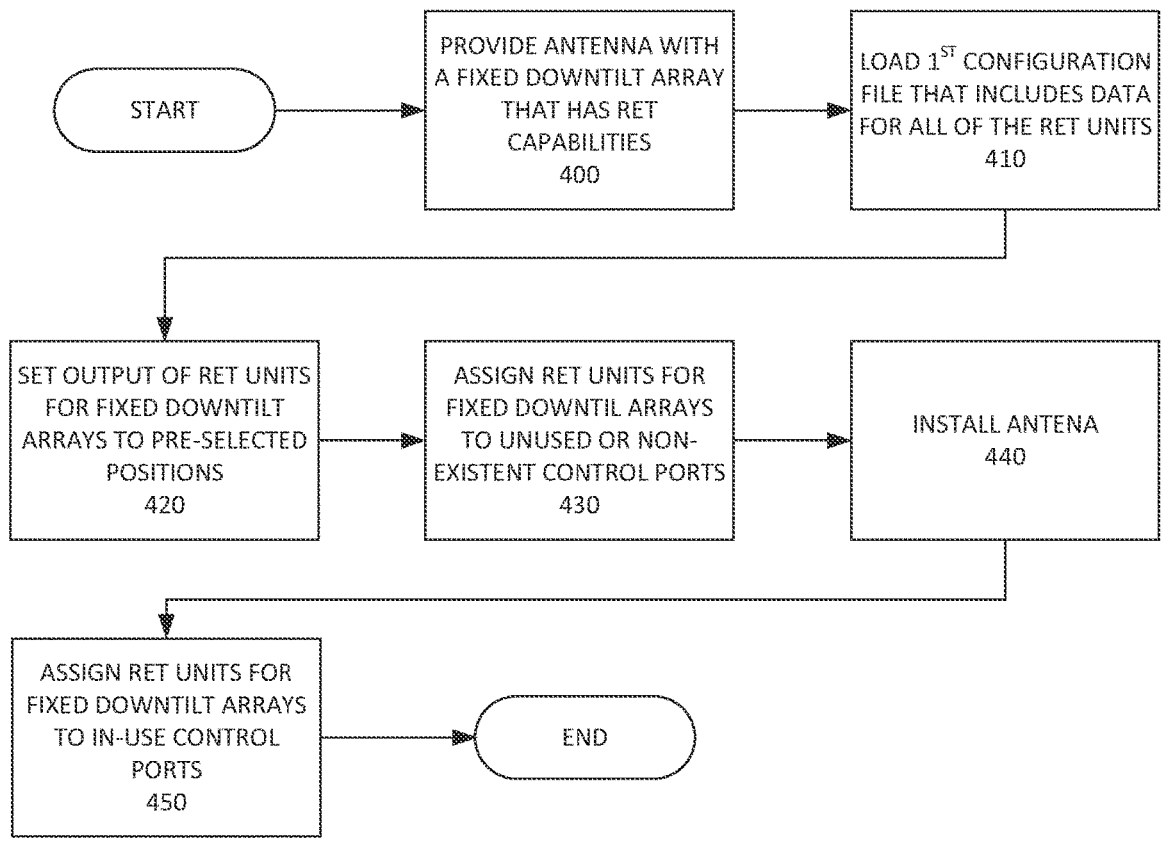
FIG. 5 is a flow chart illustrating a second method according to embodiments of the present invention of initially configuring an array of radiating elements that is included in a base station antenna to operate as fixed downtilt array.

FIG. 5 is a flow chart illustrating the above described second method according to embodiments of the present invention for configuring an array on a base station antenna to initially have a fixed downtilt, but to be configurable to later have remote electronic downtilt capabilities. As shown in FIG. 5, a base station antenna 100 is provided that includes at least one array (here array 140) that is to be operated as a fixed downtilt array, but which has the capability to later be upgraded, from a remote location, to operate as a variable tilt array (Block 400). A first RET unit configuration file may be loaded into the memory 170 of base station antenna 100, where the first RET unit configuration file includes data for all of the RET units 150 included in base station antenna 100 (Block 410). Then, for each array of radiating elements that is to initially be operated as a fixed downtilt array (in this example, array 140) the output member of the RET unit 150 that is associated with the array is set to a position that corresponds to a pre-selected electronic downtilt for the array 140 (Block 420). The software/data that is stored in antenna 100 that specifies the assignments between the RET units 150 and the control ports 108 may assign RET unit 150-4 to a non-existent control port (e.g., a control port 108-4) or to an unused control port (e.g., control port 108-1 or control port 108-3) (Block 430). The antenna 100 may then be shipped to a wireless operator (i.e., a customer) and installed for use (Block 440). Thereafter, the wireless operator may decide to transition one or more of the fixed downtilt arrays to have remote electronic downtilt capabilities. When such a decision is made, the wireless operator may send a command to the antenna 100 that reconfigures the assignments between the RET units 150 and the control ports 108 to reassign the RET unit 150-4 to control port 108-2 (Block 450). This will allow the wireless operator to perform remote electronic downtilt on all of the arrays in the antenna 100.

Pursuant to a third method according to embodiments of the present invention, a subset of the arrays 120, 130, 140 (e.g., array 140) on base station antenna 100 may be configured as fixed downtilt arrays by loading a RET unit configuration file into the memory 170 of the base station antenna 100 that has false data stored therein. In particular, the RET unit configuration file may include data specifying the positions of the output members for each RET unit 150 associated with a fixed downtilt array (here array 140) that will result in the RET unit being constrained within a very tight tilt angle range that is about a desired fixed downtilt range for the array.

In particular, as discussed above, the RET unit configuration file may include a data structure such as a "downtilt table" that specifies the physical positions of the output members of each RET unit 150 that correspond to different amounts of electronic downtilt that are applied to the antenna beam generated by the corresponding array 120, 130, 140. By modifying this data structure to specify that the physical position of the output member of the RET unit 150 associated with fixed downtilt array 140 are all at the same position or within a very tight range of positions, the output member of the RET unit 150 may be constrained to apply substantially the pre-selected amount of fixed downtilt, regardless of the amount of downtilt ordered (via AISG commands) by a wireless operator controlling the antenna. For example, if a fixed downtilt of 6.0° is desired for the antenna beams generated by array 140, the downtilt table for array 140 that is initially loaded into antenna 100 may specify positions for the output member of RET unit 150-4 be at positions which maintain the electronic downtilt applied to the antenna beams generated by array 140 within a range of, for example, 5.9-6.1°, or even within a range of 6.0° (e.g., by specifying the exact same position for the output member of RET unit 150-4 for every possible electronic downtilt value). In this embodiment, the array 140 will seemingly function as a remote electronic downtilt array, but the change that is effected to the downtilt angle is made to be de minimis since "false" data is loaded into the downtilt table for the RET unit 150-4 that is associated with array 140. If the fixed tilt array 140 later needs to be upgraded to have remote electronic downtilt capabilities, a replacement RET unit configuration file having an updated downtilt table may be loaded into antenna 100, where the new downtilt table specifies the actual (i.e., correct) positions of the output member of the RET unit 150-4 that will impart the different amounts of remote electronic downtilt to array 140.

Figure 6:
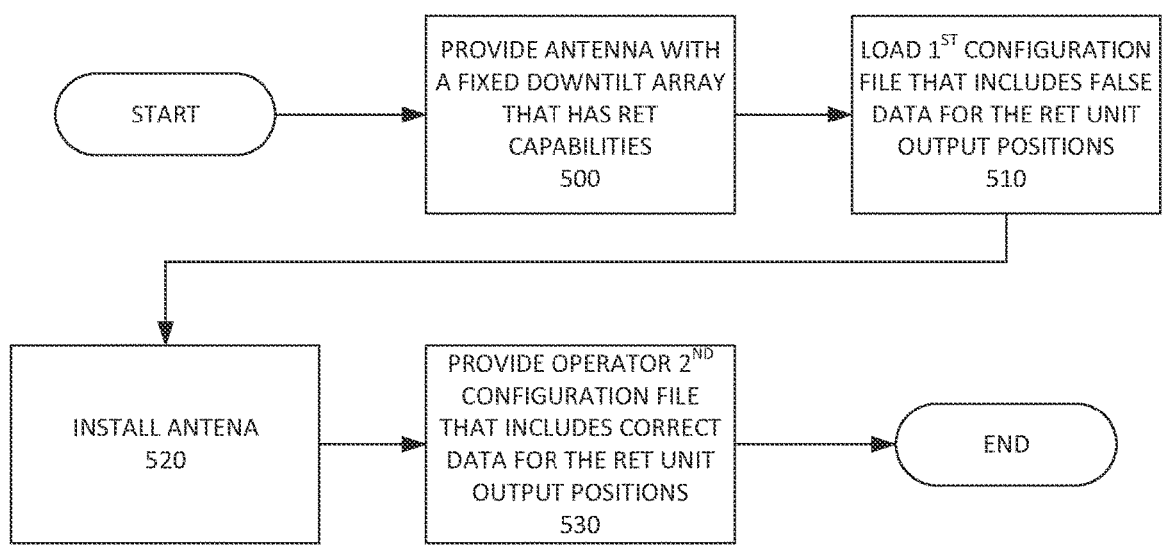
FIG. 6 is a flow chart illustrating a third method according to embodiments of the present invention of initially configuring an array of radiating elements that is included in a base station antenna to operate as fixed downtilt array.

FIG. 6 is a flow chart illustrating this third method according to embodiments of the present invention of configuring an array on a base station antenna to initially have a fixed downtilt, but to be configurable to later have remote electronic downtilt capabilities. As shown in FIG. 6, a base station antenna is provided that includes at least one array that is to be operated as a fixed downtilt array, but which has the capability to later be upgraded, from a remote location, to operate as a variable tilt array (Block 500). A first RET unit configuration file may be loaded into the memory 170 of base station antenna 100, where the first RET unit configuration file includes false data for the positions of the output member of the RET unit 150 for array 140 that correspond to different amounts of electronic downtilt (Block 510). In particular, the false data may indicate that the output member of the RET unit 150 associated with array 140 should be at the same position for every possible amount of electronic downtilt, or constrained to be within a very tight range that will maintain a substantially constant downtilt angle regardless of the amount of electronic downtilt specified by the wireless operator. The antenna 100 may then be shipped to a wireless operator (i.e., a customer) and installed for use (Block 520). Thereafter, the wireless operator may decide to transition the fixed downtilt array 140 to have remote electronic downtilt capabilities. In order to accomplish this, a second RET unit configuration file may be provided to the wireless operator that includes the correct data specifying the position of the output member for the RET unit 150 associated with array 140, and this second RET unit configuration file may be uploaded to the antenna 100 (Block 530). This will allow the wireless operator to perform remote electronic downtilt on all of the arrays in the antenna 100. Alternatively, the second RET unit configuration file may be preloaded into the antenna 100, and may be accessed by the wireless operator by sending a command to the antenna that specifies switching from the first RET unit configuration file to the second RET unit configuration file.

It will be appreciated that in some cases a RET unit may be associated with multiple arrays of radiating elements. For example, in another embodiment, the four-column array 140 depicted in FIG. 2 may be replaced with two linear arrays 140-1, 140-2 of radiating elements 142. The linear arrays 140-1, 140-2 may be, for example, placed side-by-side (in which case they would like, for example, the inner two columns 141 of radiating elements shown in FIG. 2) or may be vertically stacked. Each linear array 140-1, 140-2 may be implemented using dual polarized radiating elements, and hence each linear array 140-1, 140-2 may be coupled to a pair of RF ports 110. This allows the two linear arrays to implement 4×MIMO. In this situation, (similar to what is shown in FIG. 2), it may be desirable to control both linear arrays 140-1, 140-2 using the same RET unit 150-4. Thus, it will be appreciated that each RET unit 150 may be associated with a single array or may be associated with multiple arrays.

In the description above, the RET controller 160 and the RET units 150 have been described and shown in the accompanying figures as being separate units. It will be appreciated that the RET controllers and RET units may also be implemented as a single integrated unit (e.g., all of the components are contained within a single housing) and that multiple mechanical linkages may extend between this integrated unit and multiple phase shifters. Thus, while the RET controllers and RET units are generally described as being separate units, it will be realized that they can be integrated as standalone units or as a single integrated unit without departing from the scope of the present invention. Thus, an integrated unit that performs the functionality of a RET controller and a RET unit comprises both a RET controller and a RET unit, even though they may be combined together and implemented as a single unit.

Methods according to embodiments of the present invention have been described above with reference to flow chart diagrams. It will be appreciated that there may be fewer or additional operations included in these methods. Moreover, the order of the operations may be changed from what is show, and/or two or more of the operations may be combined into a single operation or performed concurrently.

It will be appreciated that the above embodiments are intended as examples only, and that a wide variety of different embodiments fall within the scope of the present invention. It will also be appreciated that any of the above embodiments may be combined.

The present invention has been described above with reference to the accompanying drawings. The invention is not limited to the illustrated embodiments; rather, these embodiments are intended to fully and completely disclose the invention to those skilled in this art. In the drawings, like numbers refer to like elements throughout. Thicknesses and dimensions of some components may be exaggerated for clarity.

Spatially relative terms, such as "under", "below", "lower", "over", "upper", "top", "bottom" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Herein, the terms "attached", "connected", "interconnected", "contacting", "mounted" and the like can mean either direct or indirect attachment or contact between elements, unless stated otherwise.

Well-known functions or constructions may not be described in detail for brevity and/or clarity. As used herein the expression "and/or" includes any and all combinations of one or more of the associated listed items.

The terminology used herein is for the purpose of describing particular embodiments only and is not intended to be limiting of the invention. As used herein, the singular forms That which is claimed is:

1. A method of configuring an antenna that includes a plurality of arrays of radiating elements and a plurality of remote electronic tilt ("RET") units, where each RET unit is associated with a respective group of one or more of the arrays of radiating elements, the method comprising:
loading a first RET unit configuration file into a memory of the antenna, where the first RET unit configuration file includes configuration data for all of the RET units and the antenna is configured so that a first of the arrays of radiating elements operates as a fixed downtilt array of radiating elements that does not have remote electronic downtilt capabilities.

2. The method of claim 1, the method further comprising setting an output of the RET unit associated with the first of the arrays of radiating elements to a position that corresponds to a pre-selected electronic downtilt for the first of the arrays of radiating elements.

3. The method of claim 2, wherein the RET unit associated with the first of the arrays of radiating elements is assigned to a first bus that either does not exist or that is not accessible to an operator of the antenna.

4. The method of claim 3, wherein the antenna includes a RET controller that is configured to assign the RET unit associated with the first of the arrays of radiating elements to a second bus in response to receipt of an Antenna Interface Standards Group (AISG) control signal.

5. The method of claim 4, wherein the AISG control signal comprises AISG 2.0 command number 0x32, AISG 2.0 command number 0x89 or AISG command numbers 0x40, 0x41 and 0x42.

6. The method of claim 1, wherein the first RET unit configuration file includes, for the first of the arrays of radiating elements, values that specify positions for an output of the RET unit associated with the first of the arrays of radiating elements that correspond to different amounts of electronic downtilt, where each value is substantially the same so that the first of the arrays of radiating elements operates substantially as a fixed downtilt array of radiating elements.

7. The method of claim 6, the method further comprising providing a second RET unit configuration file that includes, for the first of the arrays of radiating elements, values that specify positions for an output of the RET unit associated with the first of the arrays of radiating elements that correspond to different amount of electronic downtilt, where each value for a position of the output of the RET unit is a value that will implement the corresponding amount of electronic downtilt to an antenna beam generated by the first of the arrays of radiating elements.

8. The method of claim 6, wherein the antenna includes a RET controller that is configured to receive an Antenna Interface Standards Group (AISG) control signal and to load a RET unit configuration file into the memory of the antenna that is included in the AISG control signal.

9. The method of claim 8, wherein the AISG control signal comprises AISG 2.0 command number 0x32, AISG 2.0 command number 0x89 or AISG command numbers 0x40, 0x41 and 0x42.

10. The method of claim 1, wherein the antenna comprises a base station antenna, and wherein the first of the arrays of radiating elements is configured to operate in all or part of a 3.4-3.8 GHz frequency band.

11. The method of claim 1, wherein the first RET unit configuration file does not recognize the first of the arrays of radiating elements.

12. The method of claim 11, wherein an output member of the RET unit associated with the first of the arrays of radiating elements is set to a pre-selected position corresponding to a pre-selected electronic downtilt for the first of the arrays of radiating elements.

13. The method of claim 12, the method further comprising loading a second RET unit configuration file into the memory of the antenna that recognizes the first of the arrays of radiating elements.

14. The method of claim 1, wherein the first RET unit configuration file does not include configuration data for the RET unit associated with the first of the arrays of radiating elements.

15. The method of claim 14, the method further comprising setting an output member of the RET unit associated with the first of the arrays of radiating elements to a position that corresponds to a pre-selected electronic downtilt for the first of the arrays of radiating elements.

16. The method of claim 15, wherein setting the output of the RET unit associated with the first of the arrays of radiating elements to the position that corresponds to the pre-selected electronic downtilt for the first of the arrays of radiating elements in the subset comprises:
physically setting the output of the RET unit associated with the first of the arrays of radiating elements to the position that corresponds to the pre-selected electronic downtilt for the first of the arrays of radiating elements.

17. The method of claim 15, wherein setting the output of the RET unit associated with the first of the arrays of radiating elements to the position that corresponds to the pre-selected electronic downtilt for the first of the arrays of radiating elements comprises the following steps:
loading a second RET unit configuration file into the memory of the antenna; and then
uploading a command to the antenna that causes the antenna to set the output of the RET unit associated with the first of the arrays of radiating elements to the position that corresponds to a pre-selected electronic downtilt for the first of the arrays of radiating elements.

18. The method of claim 17, wherein the command is uploaded prior to loading the first RET unit configuration file into the memory of the antenna.

19. The method of claim 14, wherein the antenna includes a RET controller that is configured to receive an Antenna Interface Standards Group (AISG) control signal that includes a second RET unit configuration file as a payload appended thereto, and to load the second RET unit configuration file into the memory of the antenna.

20. The method of claim 19, wherein the AISG control signal comprises AISG 2.0 command number 0x32, AISG 2.0 command number 0x89 or AISG command numbers 0x40, 0x41 and 0x42.

* * * * *